US012792231B2

(12) United States Patent
Ayyapureddi

(10) Patent No.: US 12,792,231 B2
(45) Date of Patent: Nov. 10, 2026

(54) MEMORY DEVICES HAVING STAGGERED OPERATIONS FOR ERROR CHECK AND SCRUB REPORTS

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 3 days.

(21) Appl. No.: 19/177,901

(22) Filed: Apr. 14, 2025

(65) Prior Publication Data

US 2026/0104803 A1 Apr. 16, 2026

Related U.S. Application Data

(60) Provisional application No. 63/635,016, filed on Apr. 17, 2024.

(51) Int. Cl.
*G06F 3/06* (2006.01)

(52) U.S. Cl.
CPC .......... *G06F 3/0619* (2013.01); *G06F 3/0632* (2013.01); *G06F 3/0679* (2013.01)

(58) Field of Classification Search
CPC .... G06F 3/0619; G06F 3/0632; G06F 3/0679; G06F 3/064; G06F 11/10; G06F 11/1068; G11C 11/406; G11C 29/42; G11C 29/52
See application file for complete search history.

(56) References Cited

U.S. PATENT DOCUMENTS

2017/0060681 A1* 3/2017 Halbert ................. G06F 3/0679
2022/0197739 A1* 6/2022 Ryu ...................... G06F 11/106
2023/0015086 A1* 1/2023 Ayyapureddi ......... G11C 29/42

FOREIGN PATENT DOCUMENTS

WO WO-2022066178 A1 * 3/2022 ............ G11C 29/02

* cited by examiner

*Primary Examiner* — Tracy C Chan
(74) *Attorney, Agent, or Firm* — Schwegman Lundberg & Woessner, P.A.

(57) ABSTRACT

Some embodiments include apparatuses and methods of operating the apparatuses. One of the apparatuses includes a bus, a first memory device coupled to the bus, and a second memory device coupled to the bus. The first memory device includes first circuitry to perform a first error check and scrub (ECS) operation, and a first register circuit to store first information associated with a first time interval to report a result of the first ECS operation to the bus. The memory device includes second circuitry to perform an ECS operation and a second register circuit to store second information associated with a second time interval to report a result of the first ECS operation to the bus.

20 Claims, 8 Drawing Sheets

200

500

600

MEMORY DEVICES HAVING STAGGERED OPERATIONS FOR ERROR CHECK AND SCRUB REPORTS

PRIORITY APPLICATION

This application claims the benefit of priority to U.S. Provisional Application Ser. No. 63/635,016, filed Apr. 17, 2024, which is incorporated herein by reference in its entirety.

FIELD

Embodiments described herein relate to error check and scrub (ECS) operations in memory devices.

BACKGROUND

Memory devices, such as dynamic random-access memory (DRAM) devices, have memory cells to store information. A DRAM device stores information in the form of charge in a capacitor of the memory cell. The value of information (e.g., a bit of information) is based on the amount of charge in the capacitor. Charge may leak over time, which can cause the value of information stored in the memory cell to become invalid. Therefore, a DRAM device periodically performs a refresh operation to replenish the charge in the memory cell. Some DRAM devices have a so-called error check and scrub (ECS) operation to check and correct some errors in information stored in the memory cells to maintain validity of the information. Such DRAM devices also have operations to report the results of the ECS operations to an external controller device (e.g., an external memory controller). DRAM devices are often grouped together in a DRAM module to provide a larger memory storage capacity. The memory module usually has a bus shared by the DRAM devices for such error reporting purposes. The DRAM devices report results of the ECS operations to an external controller through the bus. Since such a bus is shared by the DRAM devices, waiting time to access and use the bus for reporting results of the ECS operation can be relatively long, which can degrade device performance.

DETAILED DESCRIPTION

The techniques described herein involve memory devices having staggered ECS operations and staggered ECS report operations. The memory devices have a shared bus, which is used by the memory devices to report results of the ECS operation. The staggered ECS operations and staggered ECS report operations can improve (e.g., reduce or eliminate) waiting time to access and use the bus for reporting results of ECS operations. Other improvements and benefits of the described techniques are further discussed below with reference to FIG. 1 through FIG. 6.

Figure 1:
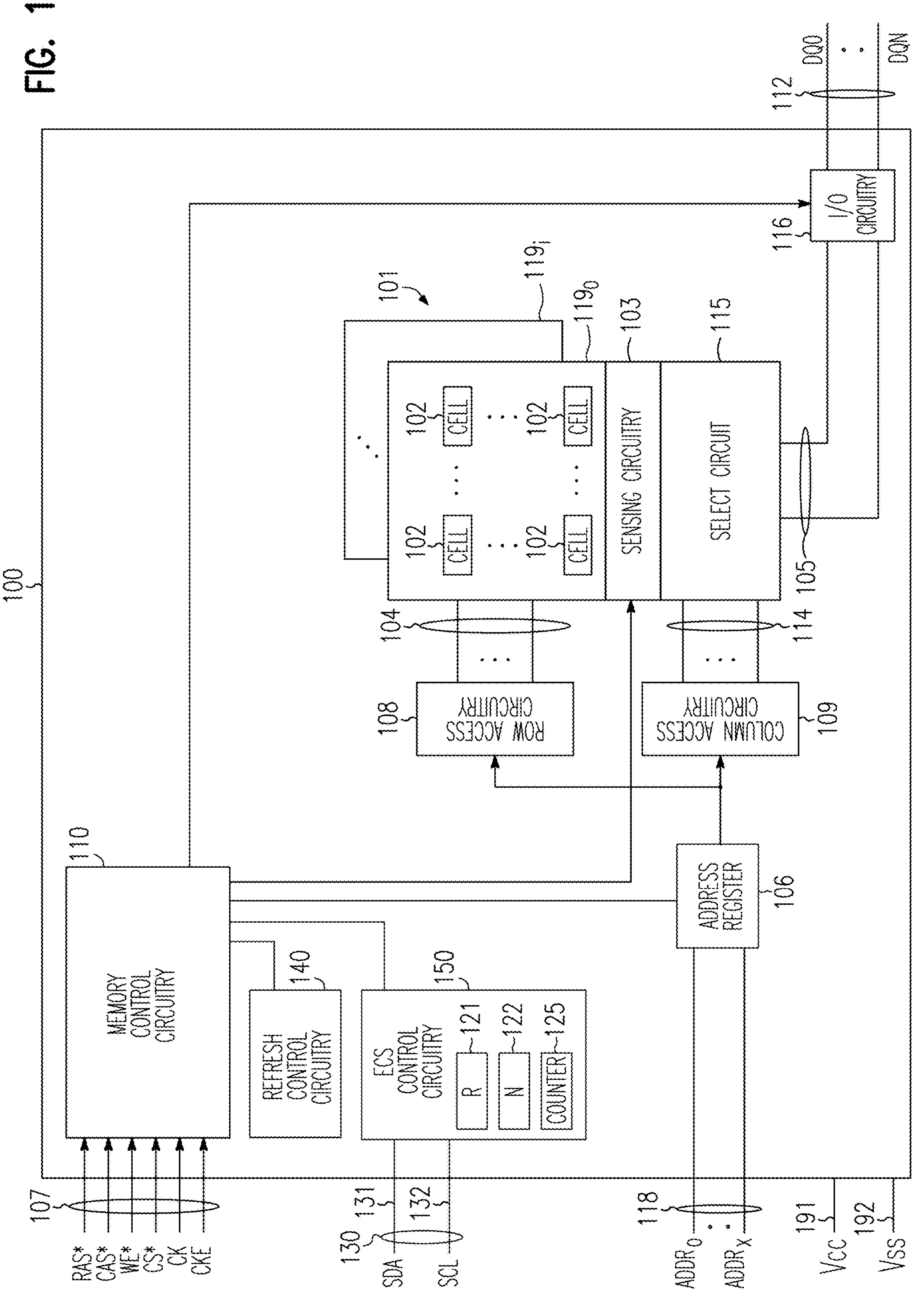
FIG. 1 shows an apparatus in the form of a memory device, according to some embodiments described herein.

FIG. 1 shows a block diagram of an apparatus in the form of a memory device 100 including volatile memory cells, according to some embodiments described herein. Memory device 100 includes a memory array (or memory arrays) 101, which can contain memory cells 102. Memory cells 102 can be organized into banks $\mathbf{119}_0$ through $\mathbf{119}_i$, each can include a number of memory cells 102. Memory device 100 can include a volatile memory device such that memory cells 102 can be volatile memory cells. An example of memory device 100 includes a dynamic random-access memory (DRAM) device. Information stored in memory cells 102 of memory device 100 may be lost (e.g., invalid) if supply power (e.g., supply voltage Vcc) is disconnected from memory device 100. Hereinafter, supply voltage Vcc is referred to as representing some voltage levels; however, they are not limited to a supply voltage (e.g., Vcc) of the memory device (e.g., memory device 100). For example, if the memory device (e.g., memory device 100) has an internal voltage generator (not shown in FIG. 1) that generates an internal voltage based on supply voltage Vcc, such an internal voltage may be used instead of supply voltage Vcc.

In a physical structure of memory device 100, each of memory cells 102 can include a transistor (e.g., an access transistor) and a storage element. The storage element can include a capacitor or other storage elements different from a capacitor. Each of memory cells 102 can be configured to store information that can represent at most one bit (e.g., a single bit having a binary 0 ("0") or a binary 1 ("1"), or more than one bit (e.g., multiple bits having a combination of at least two binary bits).

As shown in FIG. 1, memory device 100 can include access lines 104 (e.g., "word lines") and data lines (e.g., bit lines) 105. Memory device 100 can use signals (e.g., word line signals) on access lines 104 to access memory cells 102 and data lines 105 to provide information (e.g., data) to be stored in (e.g., to be written to or programed in) or read (e.g., sensed) from memory cells 102.

Memory device 100 can include an address register 106 to receive address information in the form of signals (e.g., row address signals and column address signals) $ADDR_R$ through $ADDR_X$ on conductive lines (e.g., address lines) of a bus (e.g., address bus) 118. Information ADDR is associated with addresses of memory cells 102 of memory device 100. Memory device 100 can include row access circuitry 108 (e.g., X-decoder) and column access circuitry 109 (e.g., Y-decoder) that can operate to decode address information ADDR from address register 106. Based on decoded address information, memory device 100 can determine which memory cells 102 are to be accessed during a memory operation. Memory device 100 can perform a write operation to store information in memory cells 102, and a read operation to read (e.g., sense) information (e.g., previously stored information) in memory cells 102.

Memory device 100 can receive a supply voltage, including supply voltages Vcc and Vss, on lines 191 and 192, respectively. Supply voltage Vss can operate at a ground potential (e.g., having a value of approximately zero volts). Supply voltage Vcc can include an external voltage supplied to memory device 100 from an external power source such as a battery or an alternating current to direct current (AC-DC) converter circuitry.

As shown in FIG. 1, memory device 100 can include a memory control circuitry 110, which includes components (e.g., software, firmware, hardware, or any combination of these components) to control memory operations (e.g., read, write, refresh, and error check and scrub operations) of memory device 100 based on control signals on conductive lines (e.g., control lines) of a bus (e.g., command bus) 107 of memory device 100. Examples of signals on the conductive lines of bus 107 include a row access strobe signal RAS*, a column access strobe signal CAS*, a write-enable signal WE*, a chip select signal CS*, a clock signal CK, and a clock-enable signal CKE. These signals can be part of signals provided to a DRAM device (e.g., memory device 100). Different combinations of these signals can form different commands provided memory device 100. Examples of commands on the conductive lines of bus 107 (e.g., provided to memory device 100 from a memory controller) include a read command, a write command, a refresh command (e.g., all-bank refresh REFab command), and other commands associated with a DRAM device.

As shown in FIG. 1, memory device 100 can include conductive lines (e.g., global data lines) of a bus (e.g., data bus) 112 that can carry signals DQ0 through DQN. The conductive lines of bus 112 can be part of a data bus of memory device 100. In a read operation, the value (e.g., "0" or "1") of information (read from memory cells 102) provided to the conductive lines of bus 112 (in the form of signals DQ0 through DQN) can be based on the values of the signals on data lines 105. In a write operation, the value (e.g., "0" or "1") of information provided to data lines 105 (to be stored in memory cells 102) can be based on the values of signals DQ0 through DQN on the conductive lines of bus 112.

Memory device 100 can include sensing circuitry 103, select circuitry 115, and input/output (I/O) circuitry 116. Column access circuitry 109 can selectively activate signals on lines (e.g., select lines) based on address signals ADDR. Select circuitry 115 can respond to the signals on lines 114 to select signals on data lines 105. The signals on data lines 105 can represent the values of information to be stored in memory cells 102 (e.g., during a write operation) or the values of information read (e.g., sensed) from memory cells 102 (e.g., during a read operation).

I/O circuitry 116 can operate to provide information read from memory cells 102 to the conductive lines of bus 112 (e.g., during a read operation) and to provide information from the conductive lines of bus 112 (e.g., provided by an external device) to data lines 105 to be stored in memory cells 102 (e.g., during a write operation). The conductive lines of bus 112 can include nodes within memory device 100 or pins (or solder balls) on a package where memory device 100 can reside. Other devices external to memory device 100 can communicate with memory device 100 through conductive buses 107, 112, and 118. Examples of the other external to memory device 100 can include a hardware memory controller (e.g., memory controller 220 (FIG. 2)) or memory controller 630 (FIG. 6) or a hardware processor (e.g., processor 615 of FIG. 6).

As shown in FIG. 1, memory device 100 can include refresh control circuitry 140 to perform a refresh operation (e.g., auto-refresh operation). In a refresh operation, memory device 100 can refresh charge in memory cells 102 to maintain the validity of information stored in memory cells 102. The refresh operation can include an all-bank refresh operation in response to an all-bank refresh (REFab) command provided on conductive lines of bus 107. The REFab command can be sent to memory device 100 from a memory controller (e.g., memory controller 220 of FIG. 2). In an all-bank refresh operation, memory device 100 can refresh memory cells 102 in the banks (e.g., all banks $\mathbf{119}_0$ through $\mathbf{119}_i$) of memory device 100.

As shown in FIG. 1, memory device 100 can include control circuitry 150 to perform an error check and scrub (ECS) operation on memory cells 102. Memory device 100 can store (locally store) error correction code (ECC) information associated with information stored in memory cells 102. The ECC information (e.g., on-die ECC information) associated with particular information stored in memory cells 102 can be generated during storing (e.g., during writing in a write operation) of that particular information in memory cells 102. The ECC information (to be stored in memory device 100) can be generated by a memory controller (e.g., memory controller 220 of FIG. 2) outside memory device 100. Correction of errors in the ECS operation can be based on the ECC information.

In the ECS operation, memory device 100 can read information (e.g., data) stored in memory cells 102. Memory device 100 can correct errors (e.g., correct a single bit error) in the read information. Then, memory device 100 can store (e.g., write back) corrected information (after any correction of errors) in memory cells 102 in memory device 100. The time interval at which memory device 100 performs the ECS operation can be based on number of refresh cycle operations. Memory device 100 can perform the ECS operation in a periodic fashion or a non-periodic fashion.

Memory device 100 can also perform an ECS report operation to report the result of the ECS operation. The result can include information indicating at least of one of the number of errors in memory cells that were corrected during the ECS operation, and the row in memory cells that has the highest number of errors. As shown in FIG. 1, ECS control circuitry 150 can include register circuits 121 and 122, and a counter 125. Register circuits 121 and 122 can be configured to store information R and information N, respectively. Register circuits 121 and 122, and counter 125 can correspond to and operate like register circuits 221, 222, and counter 225, respectively (FIG. 3A through FIG. 4B), or register circuits 231, 232, and counter 235, respectively (FIG. 3A through FIG. 4B), or register circuits 241, 242, and counter 245, respectively (FIG. 3A through FIG. 4B).

As shown in FIG. 1, memory device 100 can include conductive lines 131 and 132 of a bus 130. In the example of FIG. 1, bus 130 includes an I3C bus. The I3C bus is an electrical communication bus in accordance with MIPI Specification developed by MIPI Alliance. The MIPI Alliance is also known as Mobile Industry Processor Interface Alliance. In the example of FIG. 1, conductive lines 131 and 132 be coupled to a data line (associated with signal SDA) and a clock line (associated with signal SCL), respectively, of bus 130 (e.g., I3C bus).

In operation, memory device 100 can provide (e.g., report) the result the ECS operation to at least one of conductive lines 131 and 132. A memory controller (e.g., memory controller 220 of FIG. 2) coupled to bus 130 can receive the result of the ECS operation to further maintain reliability of information stored in memory device 100.

Memory device 100 may include other components, which are not shown in FIG. 1 so as not to obscure the example embodiments described herein. At least a portion of memory device 100 and operations of memory device 100 can include structures and operations similar to or the same as any of the memory devices described below with reference to FIG. 2 through FIG. 6.

Figure 2:
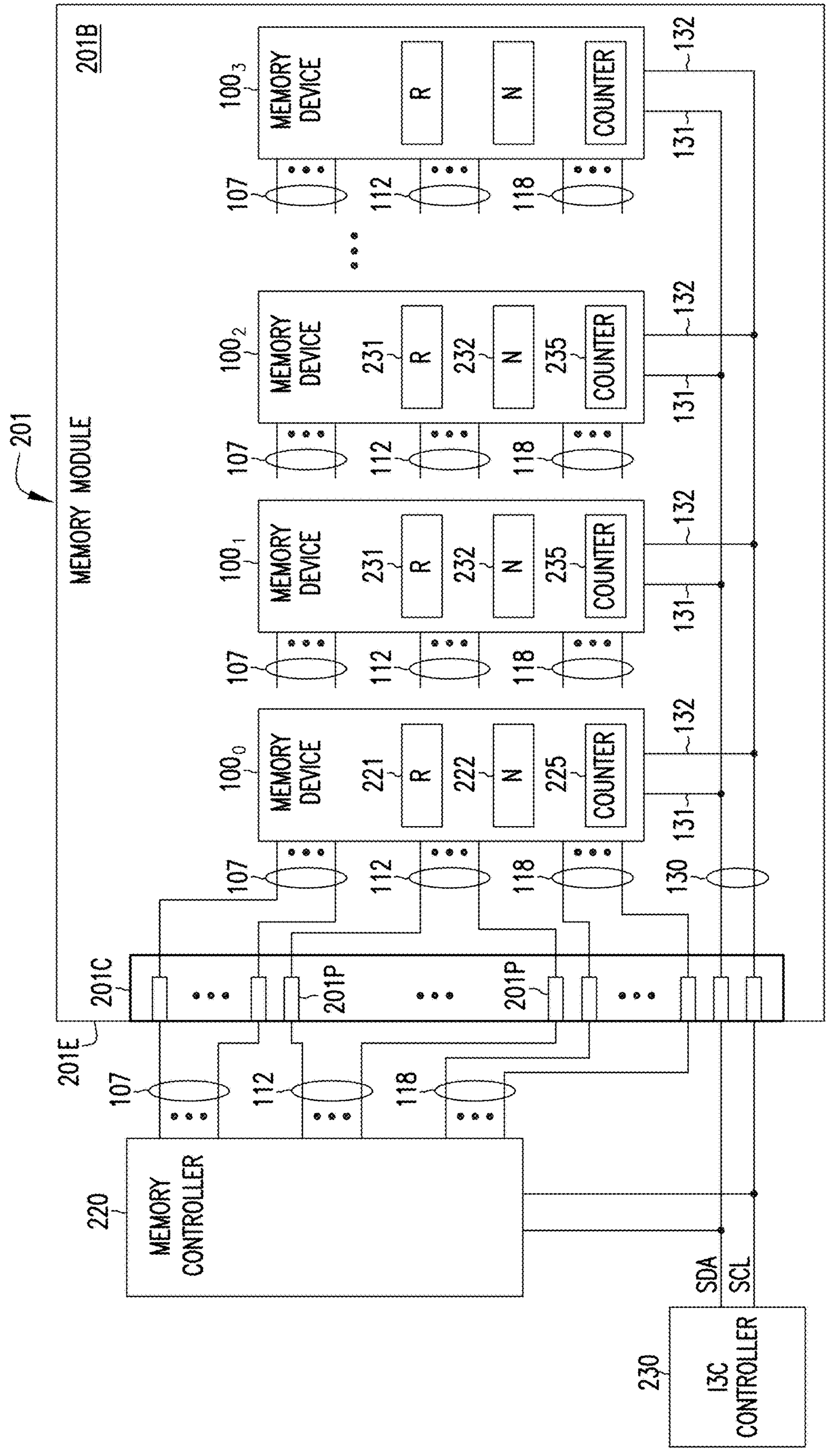
FIG. 2 shows a schematic diagram of a memory module including memory devices, according to some embodiments described herein.

FIG. 2 is a schematic diagram of an apparatus 200 including a memory module 201, a memory controller 220, and an I3C bus controller 230, according to some embodiments described herein. Apparatus 200 can include or be included in an electronic device or system, such as a computer (e.g., desktop, laptop, or notebook), a tablet, a cellular phone, a system on chip (SoC), a system in a package (SiP), or other electronic devices or systems.

As shown in FIG. 2, memory module 201 can include a circuit board (e.g., a printed circuit board (PCB)) 201B and an edge 201E. Memory module 201 can include a connector (e.g., edge connector) 201C that includes conductive pins 201P, which can include metal (e.g., copper) pins, metal traces, or other conductive connections. Memory module 201 can include memory devices $\mathbf{100}_0$, $\mathbf{100}_1$, $\mathbf{100}_2$, and $\mathbf{100}_3$ located on circuit board 201B. Each of memory devices $\mathbf{100}_0$, $\mathbf{100}_1$, $\mathbf{100}_2$, and $\mathbf{100}_3$ can include (e.g., can correspond to) memory device 100 of FIG. 1. FIG. 2 shows an example where memory module 201 includes four memory devices $\mathbf{100}_0$, $\mathbf{100}_1$, $\mathbf{100}_2$, and $\mathbf{100}_3$. However, the number of the memory devices of memory module 201 can vary.

In FIG. 2, in each of memory devices $\mathbf{100}_0$, $\mathbf{100}_1$, $\mathbf{100}_2$, and $\mathbf{100}_3$, the conductive lines of buses 107, 112, 118, and 130 can be coupled to different portions (e.g., different groups) of conductive pins 201P of memory module 201. For simplicity, only connections between connector 201C and buses 107, 112, and 118 of memory device $\mathbf{100}_0$ are shown in FIG. 2. Buses 107, 112, and 118 of memory devices $\mathbf{100}_0$, $\mathbf{100}_1$, $\mathbf{100}_2$, and $\mathbf{100}_3$ can be coupled to conductive pins 201P in a fashion similar to memory device $\mathbf{100}_0$.

In FIG. 2, connective lines 131 and 132 of respective memory devices $\mathbf{100}_0$, $\mathbf{100}_1$, $\mathbf{100}_2$, and $\mathbf{100}_3$ can be coupled to two of conductive pins 201P that are associated with the data line (associated with signal SDA) and the clock line (associated with signal SCL), respectively, of bus (e.g., I3C bus) 130.

As shown in FIG. 2, apparatus 200 can include an I3C bus controller (hardware bus controller) 230 coupled to bus 130. Bus I3C controller 230 can operate control communication on bus 130 based on MIPI Specification for I3C. Memory devices $\mathbf{100}_0$, $\mathbf{100}_1$, $\mathbf{100}_2$, and $\mathbf{100}_3$ share bus 130 based on MIPI Specification for I3C. For example, each of memory devices $\mathbf{100}_0$, $\mathbf{100}_1$, $\mathbf{100}_2$, and $\mathbf{100}_3$ can generate In-Band Interrupt (IBI) on bus 130. I3C controller 230 can perform an arbitration if multiple memory devices among memory devices $\mathbf{100}_0$, $\mathbf{100}_1$, $\mathbf{100}_2$, and $\mathbf{100}_3$ generate the IBI on bus 130. The arbitration decides which memory device among memory devices $\mathbf{100}_0$, $\mathbf{100}_1$, $\mathbf{100}_2$, and $\mathbf{100}_3$ can access and use bus 130 (e.g., to report the result of the ECS operation). In some situations, the wait time to access and use bus 130 may be relatively long if a relatively high number of memory devices among memory devices $\mathbf{100}_0$, $\mathbf{100}_1$, $\mathbf{100}_2$, and $\mathbf{100}_3$ generate the IBI on bus 130 (e.g., to reports results of ECS operations). However, as described in more detail below, memory devices $\mathbf{100}_0$, $\mathbf{100}_1$, $\mathbf{100}_2$, and $\mathbf{100}_3$ have staggered ECS operations and staggered ECS reportion operations. Such staggered operations can reduce or eliminate collision of IBI bus generations, thereby reducing or eliminating a relatively long wait time for memory devices $\mathbf{100}_0$, $\mathbf{100}_1$, and $\mathbf{100}_2$, and $\mathbf{100}_3$ to access and use bus 130 for reporting results of ECS operations.

In FIG. 2, memory controller 220 can include circuitry to provide (e.g., send) commands (e.g., read, write, and refresh commands) on bus 107 to memory devices $\mathbf{100}_0$, $\mathbf{100}_1$, $\mathbf{100}_2$, and $\mathbf{100}_3$. As described above, the refresh command can include the REFab (all-bank refresh) command. Memory devices $\mathbf{100}_0$, $\mathbf{100}_1$, $\mathbf{100}_2$, and $\mathbf{100}_3$ can use bus 130 to communicate (e.g., to send) information associated with results of ECS operations to memory controller 220. As described above, the result of the ECS operation in a particular memory device can include information indicating at least one of the number of errors in memory cells 102 that were corrected during the ECS operation, and the row in memory cells 102 that has the highest number of errors. The timing (e.g., time intervals) for ECS operations and for reporting results of the ECS operations is described in detail below.

Figure 3A:
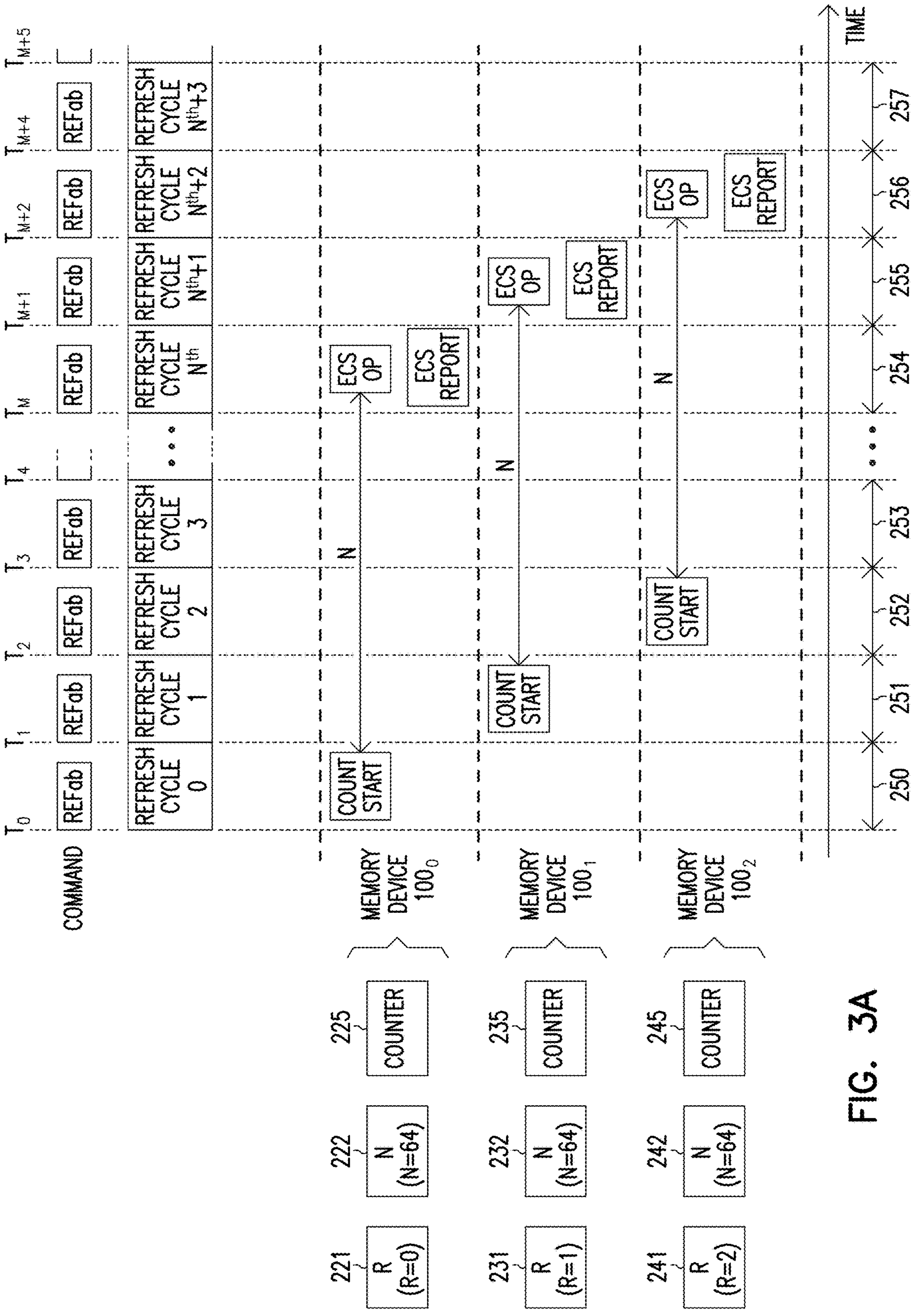
FIG. 3A is diagram showing relative timing of refresh operations, ECS operations, and ECS report operations of some of the memory devices of the memory module of FIG. 2, according to some embodiments described herein.

FIG. 3A is diagram showing relative timing of ECS operations and ECS report operations of some of the memory devices of memory module 201 of FIG. 2, according to some embodiments described herein. For simplicity, FIG. 3A shows three memory devices $\mathbf{100}_0$, $\mathbf{100}_1$, and $\mathbf{100}_2$ and their associated circuitries and ECS operations. Other memory devices of memory module 201 can have similar circuitry and patterns of ECS operations (e.g., staggered ECS operations) as the three memory devices $\mathbf{100}_0$, $\mathbf{100}_1$, and $\mathbf{100}_2$ shown in FIG. 3A.

In FIG. 3A, times $T_0$ through $T_{M+5}$ are points in time. FIG. 3A shows a timeline in which time $T_0$ occurs before time $T_1$. Time $T_1$ occurs before time $T_2$, and so on.

In FIG. 3A, time intervals 250 through 257 represent different time intervals (durations) between time $T_0$ and $T_{M+5}$. Each of time intervals 250 through 257 is a time interval (duration) between two respective times. For example, time interval 250 is between times $T_0$ and $T_1$. Time interval 251 is the time interval between times $T_1$ and $T_2$. Time interval 252 is the time interval between times $T_2$ and $T_3$, and so one. Time intervals 250 through 257 can have an equal amount of time (e.g., measured in time unit (e.g., millisecond)) among each other.

In FIG. 3A, the REFab command is the all-bank refresh command that can be provided (e.g., issued) by memory controller 220 (FIG. 2) to memory devices $\mathbf{100}_0$, $\mathbf{100}_1$, and $\mathbf{100}_2$. The REFab command can be provided (e.g., periodically provided) at times time $T_0$ through T $T_{M+5}$ (associated with time intervals 250 through 257).

In FIG. 3A, refresh cycle 0 operation through refresh cycle M+3 operation are refresh operations (e.g., auto-refresh operation) performed by memory devices $\mathbf{100}_0$, $\mathbf{100}_1$, and $\mathbf{100}_2$ during respective time intervals 250 through 257. Each of refresh cycle 0 operation through refresh cycle M+3 operation can be performed in response to a respective REFab command. In each of refresh cycle 0 operation through refresh cycle M+3 operation, memory devices $\mathbf{100}_0$, $\mathbf{100}_1$, and $\mathbf{100}_2$ can perform an all-bank refresh operation to refresh the memory cells 102 in the banks (e.g., all bank $\mathbf{119}_0$ through $\mathbf{119}_i$ in FIG. 1) of a respective memory device.

As shown in FIG. 3A, each of memory devices $\mathbf{100}_0$, $\mathbf{100}_1$, and $\mathbf{100}_2$ can also perform an ECS operation an ECS report operation. As described above, the ECS operation can be performed to check and correct errors in information stored in the memory cells of the memory device. The ECS report operation be performed to report the result of an associated ECS operation.

In the example of FIG. 3A, the refresh cycle operation, the ECS operation, and the ECS report operation can be performed one after another during a particular time interval. For example, as shown during time interval 254 in FIG. 3A, memory device $\mathbf{100}_0$ can perform an all-bank refresh cycle $N^{th}$ operation (e.g., during an initial portion of time interval 254), an ECS operation (e.g., during a subsequent portion of time interval 254 after the refresh cycle $N^{th}$ operation), and an ECS report operation (e.g., during another subsequent portion of time interval 254 after the ECS operation associated with the refresh cycle $N^{th}$ operation).

In another example, as shown during time interval 255 in FIG. 3A, memory device $\mathbf{100}_1$ can perform an all-bank refresh cycle $N^{th}$+1 operation (e.g., during an initial portion of time interval 255), an ECS operation (e.g., during a subsequent portion of time interval 255 after the refresh cycle $N^{th}$+1 operation), and an ECS report operation (e.g., during another subsequent portion of time interval 255 after the ECS operation associated with the refresh cycle $N^{th}$+1 operation).

In another example, as shown during time interval 256 in FIG. 3A, memory device $\mathbf{100}_2$ can perform an all-bank refresh cycle $N^{th}$+2 operation (e.g., during an initial portion of time interval 256), an ECS operation (e.g., during a subsequent portion of time interval 256 after the refresh cycle $N^{th}$+2 operation), and an ECS report operation (e.g., during another subsequent portion of time interval 256 after the ECS operation associated with the refresh cycle $N^{th}$+2 operation).

Thus, as shown in FIG. 3A memory devices $\mathbf{100}_0$, $\mathbf{100}_1$, and $\mathbf{100}_2$ may not concurrently (e.g., not simultaneously) perform the ECS operations. Memory devices $\mathbf{100}_0$, $\mathbf{100}_1$, and $\mathbf{100}_2$ can perform respective ECS operations (e.g., three ECS operations) in a staggered fashion (staggered pattern) during time intervals 254, 255, and 256, respectively. As also shown in FIG. 3A, memory devices $\mathbf{100}_0$, $\mathbf{100}_1$, and $\mathbf{100}_2$ may not concurrently (e.g., not simultaneously) perform the ECS report operations. Memory devices $\mathbf{100}_0$, $\mathbf{100}_1$, and $\mathbf{100}_2$ can perform respective ECS report operations in a staggered fashion (staggered pattern) during time intervals 254, 255, and 256, respectively.

The staggered ECS operations and the staggered ECS report operations can be based on the values of information stored in (e.g., pre-programmed in) register circuits 221, 231, and 241; register circuits 222, 232, and 242; and counts (count values) in counters 225, 235, and 245 of respective memory devices $\mathbf{100}_0$, $\mathbf{100}_1$, and $\mathbf{100}_2$.

As shown in FIG. 3A, memory devices $\mathbf{100}_0$, $\mathbf{100}_1$, and $\mathbf{100}_2$ can include register circuits 222, 232, and 242, respectively, to store information N. Each of register circuits 222, 232, and 242 can include (e.g., can correspond to) register circuit 122 of memory device 100 of FIG. 1. In FIG. 3A, the value of information N can be the same from one memory device to another memory device. FIG. 3A shows an example where information N has value of 64 (e.g., N=64) stored in register circuits 221, 231, and 241, respectively, of memory devices $\mathbf{100}_0$, $\mathbf{100}_1$, and $\mathbf{100}_2$, respectively. However, other values for information N can be used. FIG. 3A shows an example where register circuits 222, 232, and 242 store the same value (e.g., the value of N=64). However, register circuits 222, 232, and 242 store values different from each other (unequal values). The values of information N can be selected (e.g., predetermined) and stored (e.g., programmed) in memory devices $\mathbf{100}_0$, $\mathbf{100}_1$, and $\mathbf{100}_2$ before memory devices $\mathbf{100}_0$, $\mathbf{100}_1$, and $\mathbf{100}_2$ are used (e.g., used to store information (e.g., data)). As described below, memory devices $\mathbf{100}_0$, $\mathbf{100}_1$, and $\mathbf{100}_2$ can perform respective ECS operations at respective time intervals based in part on the value of information N.

As shown in FIG. 3A, memory devices $\mathbf{100}_0$, $\mathbf{100}_1$, and $\mathbf{100}_2$ can include register circuits 221, 231, and 241, respectively, to store information R. Each of register circuits 221, 231, and 241 can include (e.g., can correspond to) register circuit 121 of memory device 100 of FIG. 1. In FIG. 3A, the value of information R can be different from one memory device to another memory device. FIG. 3A shows an example where information R has values of 0, 1, and 2 (e.g., R=0, R=1, and R=2) stored in register circuits 221, 231, and 241, respectively, of memory devices $\mathbf{100}_0$, $\mathbf{100}_1$, and $\mathbf{100}_2$, respectively. However, other unequal values for information R can be used. The values of information R (e.g., R=0, 1, or 2) for different memory devices $\mathbf{100}_0$, $\mathbf{100}_1$, and $\mathbf{100}_2$ can be selected (e.g., predetermined) and stored (e.g., programmed) in memory devices $\mathbf{100}_0$, $\mathbf{100}_1$, and $\mathbf{100}_2$ before memory devices $\mathbf{100}_0$, $\mathbf{100}_1$, and $\mathbf{100}_2$ are used (e.g., used to store information (e.g., data)). The different values (e.g., 0, 1, and 2) of information R in register circuits 221, 231, and 241 and the same value of information N allow memory devices $\mathbf{100}_0$, $\mathbf{100}_1$, and $\mathbf{100}_2$ to perform the ECS operations in a staggered fashion as shown in FIG. 3A.

In the example of FIG. 3A, the values of information R stored in register circuits 221, 231, and 241 can be used to indicate a starting time (count start time) for respective counters 225, 235, and 245 to start counting. Each of counters 225, 235, and 245 can be configured (e.g., programmed) to start to count at a respective reference refresh cycle operation based on a selected (e.g., reference) REFab command (e.g., the REFab command at time $T_0$). The value of information R in a particular memory device can include an offset value indicating the number of (how many) REFab commands from the selected REFab command that a counter (one of counters 225, 235, and 245) of the particular memory device can start to count.

As shown in FIG. 3A, memory devices $\mathbf{100}_0$, $\mathbf{100}_1$, and $\mathbf{100}_2$ can include counters 225, 235, and 245, respectively. Each of counters 225, 235, and 245 can include (e.g., can correspond to) counter 125 of memory device 100 of FIG. 1. In FIG. 3A, each of counters 225, 235, and 245 can be configured to count at a particular start time (count start time) and provide a count (count value). The particular start time of the counter in a particular memory device can be based on the value of information R stored in the register of the particular memory device. For example, in register circuit 221 in FIG. 3A of memory device $\mathbf{100}_0$, information R having a value of R=0 can indicate that counter 225 can start to count at the REFab command at time $T_0$ (zero REFab command from the selected REFab command at time $T_0$). In another example, in register circuit 231 of memory device $\mathbf{100}_1$ in FIG. 3A, information R having a value of R=1 can indicate that counter 235 can start to count at the REFab command at time $T_1$ (one REFab command from the selected REFab command at time $T_0$). In another example, in register circuit 241 of memory device $\mathbf{100}_2$ in FIG. 3A, information R having a value of R=2 can indicate that counter 245 can start to count at the REFab command at time $T_2$ (two REFab commands from the selected REFab command at time $T_0$).

In operation, counter 225 can start to count from zero at time $T_0$ at a reference refresh cycle operation (e.g., refresh cycle 0 operation) of memory device $\mathbf{100}_0$. Counter 225 can increase the count (count value) by one count at each subsequent refresh cycle operation (e.g., refresh cycles 1, 2, 3, and so on) after the reference refresh cycle operation (e.g., refresh cycle 0 operation). Then, memory device $100_0$ can perform an ECS operation when the count is equal to N (e.g., count=64). In the example of FIG. 3A, counter 225 can have a count equal to N during time interval 254. Thus, memory device $100_0$ can perform an ECS operation during time interval 254 after the $N^{th}$ refresh cycle operation (which is 64 refresh cycle operations after refresh cycle 0 operation) during time interval 254 is performed.

As shown in FIG. 3A, in operation, counter 235 can start to count from zero at time $T_1$ at a reference refresh cycle operation (e.g., refresh cycle 1 operation) of memory device $100_1$. Counter 235 can increase the count (count value) by one count at each subsequent refresh cycle operation (e.g., refresh cycles 2, 3, and so on) after the reference refresh cycle 1 operation. Then, memory device $100_1$ can perform an ECS operation when the count is equal to N (e.g., count=64). In the example of FIG. 3A, counter 235 can have a count equal to N during time interval 255. Thus, memory device $100_0$ can perform an ECS operation the $N^{th}$+1 refresh cycle operation (which is 64 refresh cycle operations after refresh cycle 1 operation) during time interval 255.

As shown in FIG. 3A, in operation, counter 245 can start to count from zero at time $T_2$ at a reference refresh cycle operation (e.g., refresh cycle 2 operation) of memory device $100_2$. Counter 245 can increase the count (count value) by one count at each subsequent refresh cycle operation (e.g., refresh cycle 2 and so on) after the reference refresh cycle 2 operation. Then, memory device $100_2$ can perform an ECS operation when the count is equal to N (e.g., count=64). In the example of FIG. 3A, counter 245 can have a count equal to N during time interval 256. Thus, memory device $100_0$ can perform an ECS operation the $N^{th}$+2 refresh cycle operation (which is 64 refresh cycle operations after refresh 2 operation) during time interval 256.

As shown in FIG. 3A, memory device $100_0$ can perform an ECS report operation during time interval 254 to report the result of the ECS operation performed during time interval 254. Memory device $100_1$ can perform an ECS report operation during time interval 255 to report the result of the ECS operation performed during time interval 255. Memory device $100_2$ can perform an ECS report operation during time interval 256 to report the result of the ECS operation performed during time interval 256.

The timing (e.g., time interval) of the ECS reportion operation of a particular memory device can be based on the timing of associated ECS operations. As shown in FIG. 3A, since the ECS operation is staggered, the ECS report can also be staggered. Thus, as described above, memory devices $100_0$, $100_1$, and $100_2$ perform respective ECS operations (e.g., three ECS operations) in a staggered fashion. Memory devices $100_0$, $100_1$, and $100_2$ can perform respective ECS report operations in a staggered fashion.

The staggered ECS operations or the staggered ECS report operations, or both, can improve operation of memory module 201. As described above, memory devices $100_0$, $100_1$, and $100_2$ share bus 130. Thus, a relatively longer wait time to use bus 130 (to report ECS operations) may occur if a relatively high number of memory devices (e.g., among memory devices $100_0$, $100_1$, $100_2$, and $100_3$ of FIG. 2) request access (e.g., generate IBI) to bus 130. The staggered ECS operations and ECS report operations described herein (e.g., in reference to FIG. 3A and other figures herein) can reduce or eliminate waiting time for memory devices $100_0$, $100_1$, $100_2$, and $100_3$ to access and use bus 130 for reporting results of ECS operations.

Figure 3B:
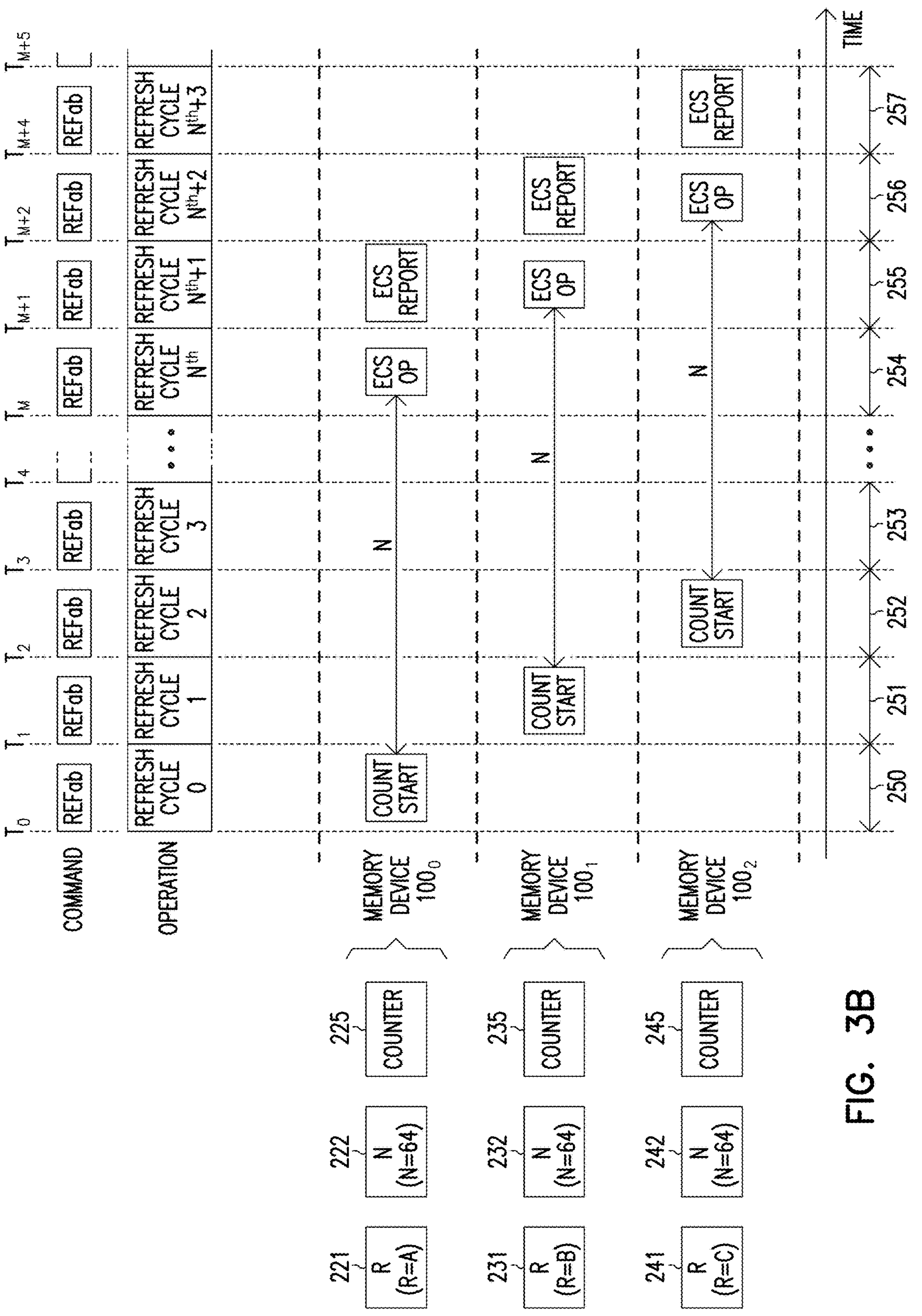
FIG. 3B is diagram showing a variation of the ECS operations and ECS report operations of the memory devices of FIG. 3A, according to some embodiments described herein.

FIG. 3B is diagram showing a variation of the refresh operations and the ECS operations of memory devices of the memory module of FIG. 3A, according to some embodiments described herein. FIG. 3B shows elements similar to or the same as the elements of FIG. 3A. For simplicity, similar or the same element between FIG. 3A and FIG. 3B are given the same labels and their description is not repeated.

As shown in FIG. 3B, like in FIG. 3A, counters 225, 235, and 245 can have different count start times, and memory devices $100_0$, $100_1$, and $100_2$ can have staggered ECS operations and staggered ECS report operations.

Differences between FIG. 3A and FIG. 3B include the timing at which memory devices $100_0$, $100_1$, and $100_2$ perform the ECS report operations. As shown in FIG. 3B, the time intervals associated with the ECS report operations can be changed (e.g., shifted) relative to the time intervals associated with the ECS report operations in FIG. 3A. For example, instead of performing the ECS report operations during the respective time intervals 254, 255, and 256 in FIG. 3A (corresponding to the time intervals of respective ECS operations in FIG. 3A), the ECS report operations in FIG. 3B can be performed during respective time intervals 255, 256, and 257 (shifted by one time interval). FIG. 3B shows that the ECS report operations are performed during time intervals 255, 256, and 257 as an example. However, the ECS report operations in FIG. 3B can be performed during time intervals different from time intervals 255, 256, and 257 as long as the ECS report operations can be performed in a staggered fashion (e.g., not performed concurrently).

In FIG. 3B, register circuits 221, 231, and 241 can be configured to store different values A, B, and C (where A, B, C are integers) to allow counters 225, 235, and 245 to have different count start times as shown in FIG. 3A. Different values A, B, and C can also allow memory devices $100_0$, $100_1$, and $100_2$ to have staggered ECS operations and staggered ECS report operations as shown in FIG. 3B.

Figure 4A:
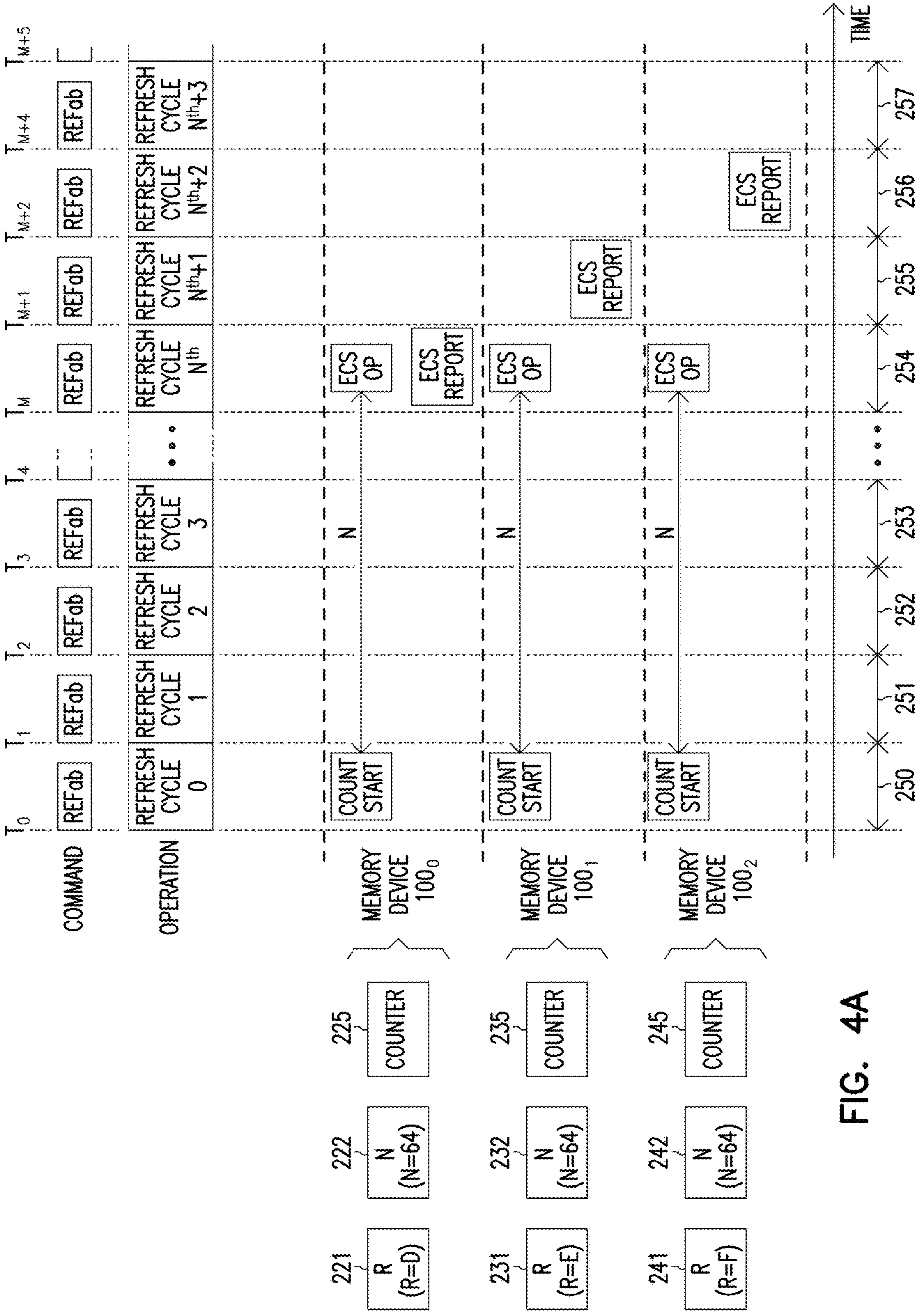
FIG. 4A is another diagram showing relative timing of refresh operations, ECS operations, and ECS report operations of some of the memory devices of the memory module of FIG. 2, according to some embodiments described herein.

FIG. 4A is a diagram showing relative timing of ECS operations and ECS report operation of some of the memory devices of memory module 201 of FIG. 2, according to some embodiments described herein. FIG. 4A shows elements similar to or the same as the elements of FIG. 3A. For simplicity, similar or the same element between FIG. 3A and FIG. 4A are given the same labels and their description is not repeated.

As shown in FIG. 4A, unlike FIG. 3A, counters 225, 235, and 245 can be configured to have the same count start time (e.g., at time $T_0$) associated with the same reference refresh cycle operation (e.g., refresh cycle 0 operation) based on a selected (e.g., reference) REFab command (e.g., the REFab command at time $T_0$). Control circuitry (e.g., like control circuitry 150 of FIG. 1) of respective devices $100_0$, $100_1$, and $100_2$ can be configured to cause respective counters 225, 235, and 245 to start to count based on the same reference refresh cycle operation (e.g., refresh cycle 0 operation in FIG. 4A).

Register circuits 222, 232, and 242 can be the same (e.g., N=64). Thus, unlike in FIG. 3A, memory devices $100_0$, $100_1$, and $100_2$ in FIG. 4A may concurrently (e.g., simultaneously) perform the ECS operations (e.g., during time interval 254) based on the count (e.g., count value equal to N).

In FIG. 4A, memory devices 100$_0$, 100$_1$, and 100$_2$ can perform the respective ECS report operations (e.g., three ECS operations) in a staggered fashion (e.g., like the staggered fashion in FIG. 3A).

The timing (e.g., time interval) of the ECS report operation of a particular memory device can be based on the value of information R stored in that particular memory device. The value of information R in a particular memory device can include a value indicating the number of (how many) REFab commands from the ECS operation the particular memory device can report the result of its ECS operation.

For example, in memory device 100$_0$ in FIG. 3A, information R having a value of R=0 in register circuit 221 can indicate that memory device 100$_0$ can report the result of its ECS operation during time interval 254 (zero REFab command from the REFab command associated with the ECS operation during time interval 254). In another example, in memory device 100$_1$ in FIG. 3A, information R having a value of R=1 in register circuit 231 can indicate that memory device 100$_1$ can report the result of its ECS operation during time interval 255 (one REFab command from the REFab command associated with the ECS operation during time interval 255). In another example, in memory device 100$_2$ in FIG. 3A, information R having a value of R=2 in register circuit 241 can indicate that memory device 100$_2$ can report the result of its ECS operation during time interval 256 (two REFab commands from the REFab command associated with the ECS operation during time interval 256).

Figure 4B:
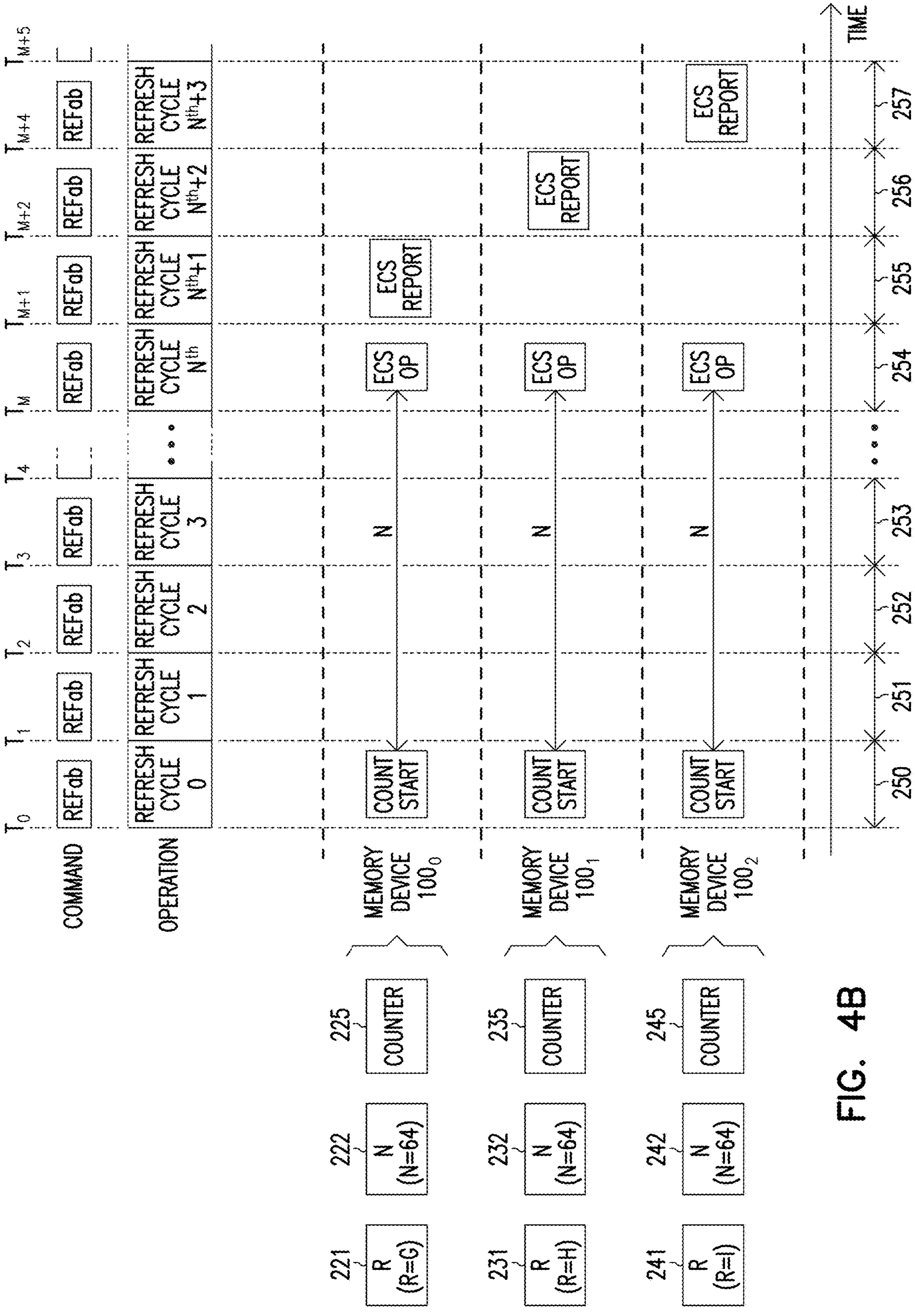
FIG. 4B is a diagram showing a variation of the ECS operations and the ECS report operations of the memory devices of FIG. 4A, according to some embodiments described herein.

FIG. 4B is diagram showing a variation of the refresh operations and the ECS operations of memory devices of the memory module of FIG. 4A, according to some embodiments described herein. FIG. 4B shows elements similar to or the same as the elements of FIG. 4A. For simplicity, similar or the same element between FIG. 4A and FIG. 4B are given the same labels and their description is not repeated.

As shown in FIG. 4B, like in FIG. 4A, counters 225, 235, and 245 can have the same count start time, and memory devices 100$_0$, 100$_1$, and 100$_2$ can concurrently perform the ECS operations (e.g., during time interval 254) based on the count (e.g., count value equal to N). Memory devices 100$_0$, 100$_1$, and 100$_2$ can also have staggered Refweb ECS report operations.

Differences between FIG. 4A and FIG. 4B include the timing at which memory devices 100$_0$, 100$_1$, and 100$_2$ perform the ECS report operations. As shown in FIG. 4B, the time intervals associated with the ECS report operations can be changed (e.g., shifted) relative to the time intervals associated with the ECS report operations in FIG. 4A. For example, instead of performing the ECS report operations during the respective time intervals 254, 255, and 256 in FIG. 4A (corresponding to the time intervals of respective ECS operations in FIG. 4A), the ECS report operations in FIG. 4B can be performed during respective time intervals 255, 256, and 257 (shifted by one time interval in comparison with FIG. 3A). FIG. 3B shows that the ECS report operations are performed during time intervals 255, 256, and 257 as an example. However, the ECS report operations in FIG. 4B can be performed during time intervals different from time intervals 255, 256, and 257 as long as the ECS report operations can be performed in a staggered fashion (e.g., not performed concurrently).

In FIG. 4B, register circuits 221, 231, and 241 can be configured to store different values G, H, and I (where G, H, and I are integers) to allow memory devices 100$_0$, 100$_1$, and 100$_2$ to have staggered ECS operations and staggered ECS report operations as shown in FIG. 4B.

Figure 5:
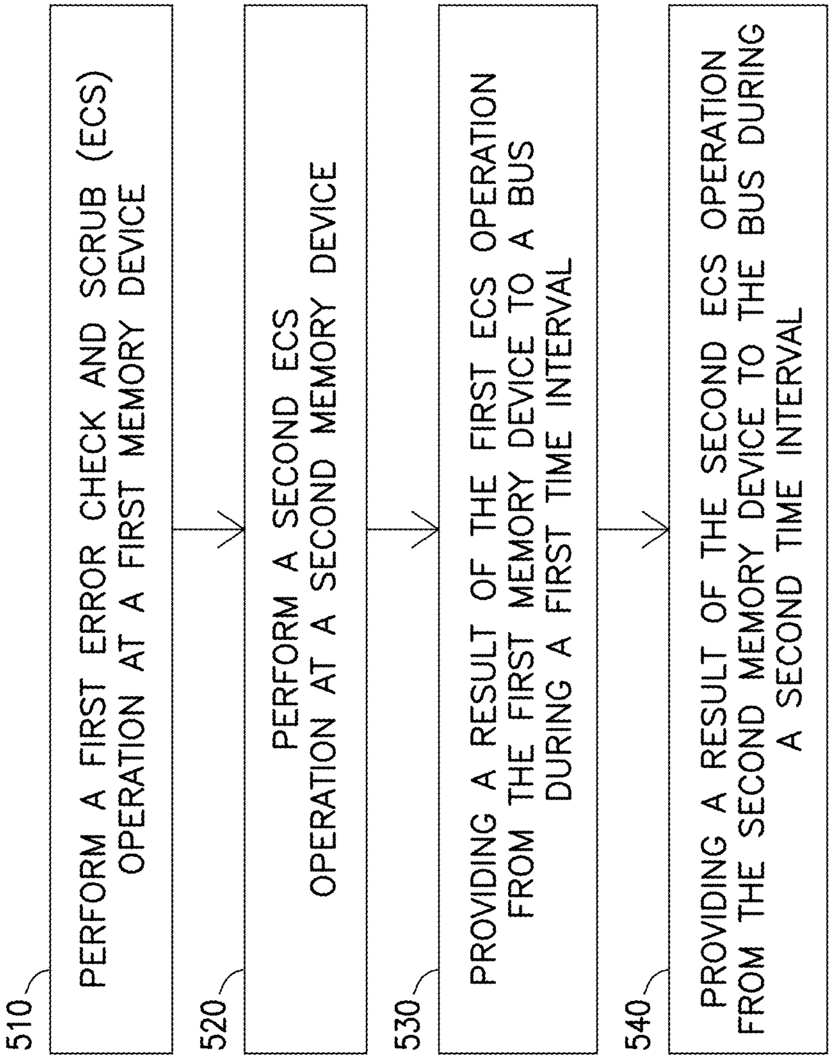
FIG. 5 is a flowchart of an example method for operating memory devices of a memory module, according to some embodiments described herein.

FIG. 5 is a flowchart of an example method 500 for operating a memory module 201, according to some embodiments described herein. Method 500 can be performed by an apparatus (e.g., apparatus 100 and apparatus 200 including memory module 201) and/or system (e.g., system 600 in FIG. 6). As shown in FIG. 5, method 500 can include activities (e.g., operations) 510, 520, 530, and 540.

Activity 510 can include performing a first ECS operation at a first memory device (e.g., one of memory devices 100$_0$, 100$_1$, 100$_2$, and 100$_3$ of FIG. 2).

Activity 520 can include performing second ECS operation at a second memory device (e.g., another memory device among memory devices 100$_0$, 100$_1$, 100$_2$, and 100$_3$ of FIG. 2). The memory devices in activities 510 and 520 can be coupled to a bus like bus 130 of FIG. 2.

Activity 530 can include providing a result of the first ECS operation from the first memory device to the bus (shared by the first and second memory devices) during a first time interval.

Activity 540 can include providing a result of the second ECS operation from the second memory device to the bus during a second time interval. In an example, the first time interval and the second time interval in activity 530 and activity 540, respectively, can include two of different time intervals associated with the ECS report operations shown in FIG. 3A, FIG. 3B, FIG. 4A, and FIG. 4B.

Method 500 described above can include fewer or more activities relative to activities 510, 520, 530, and 540 shown in FIG. 5. For example, method 500 can include additional activities (e.g., operations) associated with the apparatuses (e.g., memory device 100 and apparatus 200) including memory module 201) and/or system (e.g., system 600 in FIG. 6). As an example, method 500 can additional activities (e.g., operations) described above with reference to FIG. 3A, FIG. 3B, FIG. 4A, and FIG. 4B.

Figure 6:
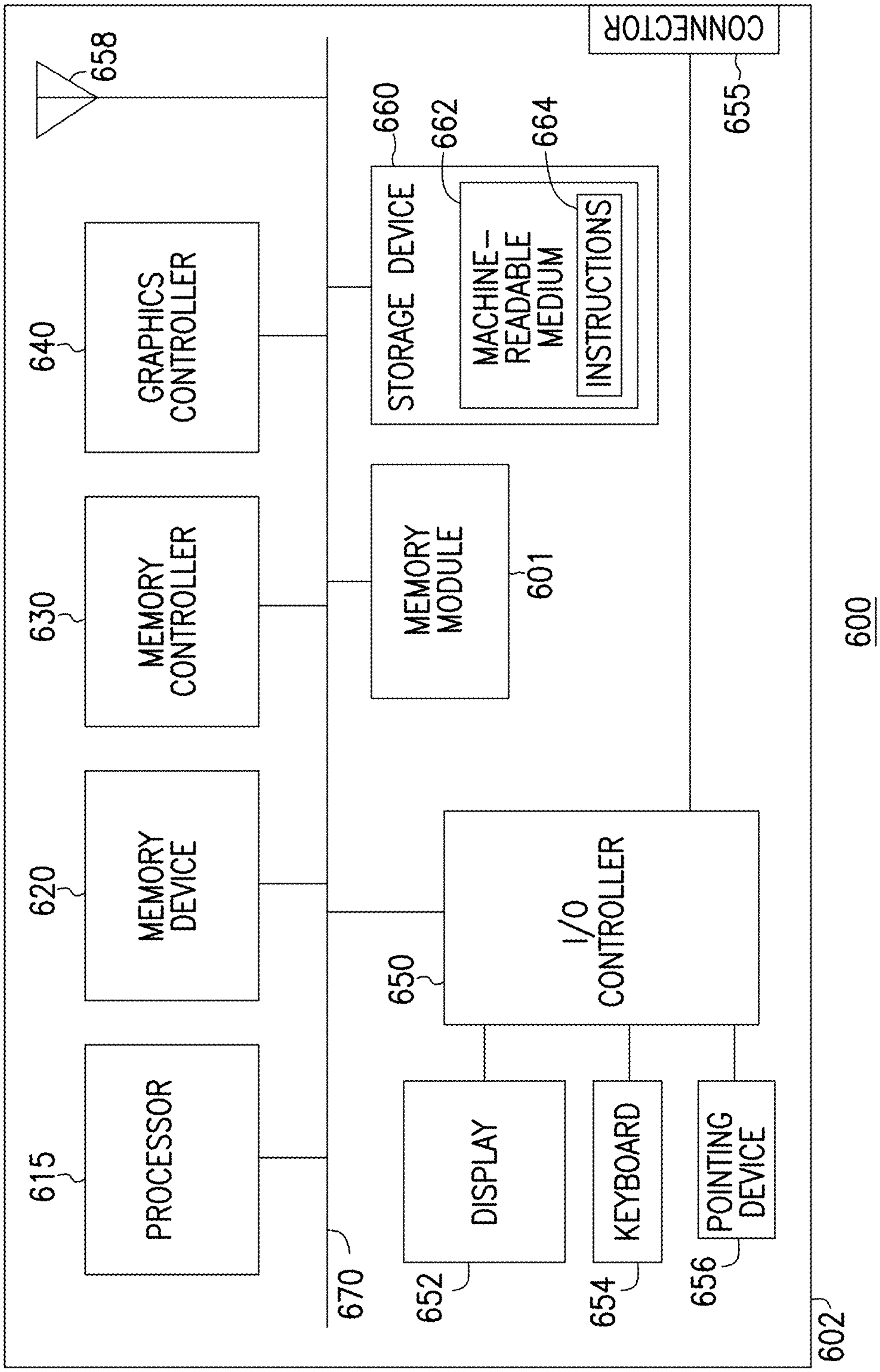
FIG. 6 shows an apparatus in the form of a system, according to some embodiments described herein.

FIG. 6 shows an apparatus in the form of a system (e.g., electronic system) 600, according to some embodiments described herein. System 600 can be viewed as a machine. System (e.g., machine) 600 can include or be included in a computer, a cellular phone, or other electronic systems. As shown in FIG. 6, system 600 can include components (e.g., devices) located on a circuit board (e.g., PCB) 602. The components can include a processor (e.g., a hardware processor) 615, a memory device 620, a memory module (e.g., DRAM module) 601, memory device 620, a memory controller 630, a graphics controller 640, an I/O controller 650, a display 652, a keyboard 654, a pointing device 656, at least one antenna 658, a storage device 660, and a bus 670. Bus 670 can include conductive lines (e.g., metal-based traces on a circuit board 602 where the components of system 600 are located).

System 600 may be configured to perform one or more of the methods and/or operations described herein. At least one of the components of system 600 (e.g., at least one of processor 615, memory device 620, memory controller 630, graphics controller 640, and I/O controller 650) can include at least one of the devices described herein. For example, memory device 620 can include one of memory devices 100, 100$_0$, 100$_1$, 100$_2$, and 100$_3$. In another example, memory module 601 can include memory module 201 of FIG. 2. Memory controller 630 can include memory controller 220 of FIG. 2.

In FIG. 6, processor 615 can include a general-purpose processor or an application specific integrated circuit (ASIC). Processor 615 can include a central processing unit (CPU) and processing circuitry. Graphics controller 640 can include a graphics processing unit (GPU) and processing circuitry. Memory device 620 can include a dynamic random-access memory (DRAM) device, a static random-access memory (SRAM) device, a flash memory device, phase change memory, or a combination of these memory devices, or other types of memory. FIG. 6 shows an example where memory device 620 is a stand-alone memory device separated from processor 615. In an alternative structure, memory device 620 and processor 615 can be located on the same IC chip (e.g., a semiconductor die or IC die). In such an alternative structure, memory device 620 is an embedded memory in processor 615, such as embedded DRAM (eDRAM), embedded SRAM (eSRAM), embedded flash memory, or another type of embedded memory.

Storage device 660 can include a drive unit (e.g., hard disk drive (HHD), solid-state drive (SSD), or another mass storage device). Storage device 660 can include a machine-readable medium 662 and processing circuitry. Machine-readable medium 662 can store one or more sets of data structures or instructions 664 (e.g., software) embodying or used by any one or more of the techniques or functions described herein. Instructions 664 may also reside, completely or at least partially, within memory device 620, memory controller 630, processor 615, or graphics controller 640 during execution thereof by system (e.g., machine) 600.

In an example, one of (or any combination of) processor 615, memory device 620, memory controller 630, graphics controller 640, and storage device 660 may constitute machine-readable media. Non-limiting machine-readable medium examples may include solid-state memories and optical and magnetic media. Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

FIG. 6 shows machine-readable medium 662 as a single medium as an example. However, the term "machine-readable medium" may include a single medium or multiple media (e.g., a centralized or distributed database, and/or associated caches and servers) configured to store instructions 664. Further, the term "machine-readable medium" may include any medium that is capable of storing, encoding, or carrying instructions for execution by system 600 and that causes system 600 to perform any one or more of the techniques of the present disclosure, or that is capable of storing, encoding or carrying data structures used by or associated with such instructions. In some examples, machine-readable media may include non-transitory machine-readable media. In some examples, machine-readable media may include machine-readable media that is not a transitory propagating signal.

Display 652 can include a liquid crystal display (LCD), a touchscreen (e.g., capacitive or resistive touchscreen), or another type of display. Pointing device 656 can include a mouse, a stylus, or another type of pointing device. In some structures, system 600 does not have to include a display. Thus, in such structures, display 652 can be omitted from system 600.

Antenna 658 can include one or more directional or omnidirectional antennas, including, for example, dipole antennas, monopole antennas, patch antennas, loop antennas, microstrip antennas, or other types of antennas suitable for transmission of radio frequency (RF) signals. In some structures, system 600 does not have to include an antenna. Thus, in such structures, antenna 658 can be omitted from system 600.

I/O controller 650 can include a communication module for wired or wireless communication (e.g., communication through one or more antennas 658). Such wireless communication may include communication in accordance with WiFi communication technique, Long Term Evolution Advanced (LTE-A) communication technique, Fifth Generation (5G) wireless system or variations or derivatives, 6G mobile networks system or variations or derivatives, 6G New Radio (NR) system or variations or derivatives, or other cellular service standards, or other communication techniques.

I/O controller 650 can also include a module to allow system 600 to communicate with other devices or systems in accordance with to one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), Ethernet, and other specifications.

Connector 655 can include terminals (e.g., pins) to allow system 600 to receive a connection (e.g., an electrical connection) from an external device (or system). This may allow system 600 to communicate (e.g., exchange information) with such a device (or system) through connector 655. Connector 655 and at least a portion of bus 670 can include conductive lines that conform with at least one of USB, DP, HDMI, Thunderbolt, PCIe, Ethernet, and other specifications.

FIG. 6 shows the components (e.g., devices) of system 600 arranged separately from each other as an example. For example, each of processor 615, memory device 620, memory controller 630, graphics controller 640, and I/O controller 650 can be included in (e.g., formed in or formed on) a separate integrated circuit (IC) chip (e.g., separate semiconductor die or separate IC die). In some structures of system 600, two or more components (e.g., processor 615, memory device 620, graphics controller 640, and I/O controller 650) of system 600 can be included in (e.g., formed in or formed on) the same IC chip (e.g., same semiconductor die), forming a SoC, or alternatively, a SiP.

The illustrations of the apparatuses (e.g., memory device 100, apparatus 200, and system 600) described above are intended to provide a general understanding of the structure of different embodiments and are not intended to provide a complete description of all the elements and features of an apparatus that might make use of the structures described herein.

Any of the components described above with reference to FIG. 1 through FIG. 6 can be implemented in a number of ways, including simulation via software. Thus, apparatuses (e.g., apparatuses 100 and 200 and system 600) may all be characterized as "modules" (or "module") herein. Such modules may include hardware circuitry, single- and/or multi-processor circuits, memory circuits, software program modules and objects and/or firmware, and combinations thereof, as desired and/or as appropriate for particular implementations of various embodiments. For example, such modules may be included in a system operation simulation package, such as a software electrical signal simulation package, a power usage and ranges simulation package, a capacitance-inductance simulation package, a power/heat dissipation simulation package, a signal transmission-reception simulation package, and/or a combination of software and hardware used to operate or simulate the operation of various potential embodiments.

The apparatuses and methods described above can include or be included in high-speed computers, communication and signal processing circuitry, single- or multi-processor modules, single or multiple embedded processors, multicore processors, message information switches, and application-specific modules including multilayer, multichip modules. Such apparatuses may further be included as subcomponents within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The illustrations of apparatuses (e.g., memory device 100 and apparatus 200) and methods (e.g., method 500 and methods of operating memory device 100, apparatus 200, and system 600) are intended to provide a general understanding of the structure of various embodiments and are not intended to provide a complete description of all the elements and features of apparatuses that might make use of the structures described herein. An apparatus herein refers to, for example, either a device (e.g., any of memory device 100 and apparatus 200) or a system (e.g., an electronic item that can include any of memory device 100 and apparatus 200).

Any of the components described above with reference to FIG. 1 through FIG. 6 can be implemented in a number of ways, including simulation via software. Thus, apparatuses (e.g., memory device 100 and apparatus 200), or part of each of these memory devices described above, may all be characterized as "modules" (or "module") herein. Such modules may include hardware circuitry, single- and/or multi-processor circuits, memory circuits, software program modules and objects and/or firmware, and combinations thereof, as desired and/or as appropriate for particular implementations of various embodiments. For example, such modules may be included in a system operation simulation package, such as a software electrical signal simulation package, a power usage and ranges simulation package, a capacitance-inductance simulation package, a power/heat dissipation simulation package, a signal transmission-reception simulation package, and/or a combination of software and hardware used to operate or simulate the operation of various potential embodiments.

The memory devices (e.g., memory device 100 and apparatus 200) described herein may be included in apparatuses (e.g., electronic circuitry) such as high-speed computers, communication and signal processing circuitry, single- or multi-processor modules, single or multiple embedded processors, multicore processors, message information switches, and application-specific modules including multilayer, multichip modules. Such apparatuses may further be included as subcomponents within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The embodiments described above with reference to FIG. 1 through FIG. 6 include apparatuses and methods of operating the apparatuses. One of the apparatuses includes a bus, and first memory device coupled to the bus and a second memory device coupled to the bus. The first memory device includes first circuitry to perform a first error check and scrub (ECS) operation, and a first register circuit to store first information associated with a first time interval to report a result of the first ECS operation to the bus. The second memory device includes second circuitry to perform an ECS operation and a second register circuit to store second information associated with a second time interval to report a result of the first ECS operation to the bus. Other embodiments, including additional apparatuses and methods, are described.

In the detailed description and the claims, the term "on" used with respect to two or more elements (e.g., materials), one "on" the other, means at least some contact between the elements (e.g., between the materials). The term "over" means the elements (e.g., materials) are in close proximity, but possibly with one or more additional intervening elements (e.g., materials) such that contact is possible but not required. Neither "on" nor "over" implies any directionality as used herein unless stated as such.

In the detailed description and the claims, a list of items joined by the term "at least one of" can mean any combination of the listed items. For example, if items A and B are listed, then the phrase "at least one of A and B" means A only; B only; or A and B. In another example, if items A, B, and C are listed, then the phrase "at least one of A, B, and C" means A only; B only; C only; A and B (excluding C); A and C (excluding B); B and C (excluding A); or all of A, B, and C. Item A can include a single element or multiple elements. Item B can include a single element or multiple elements. Item C can include a single element or multiple elements.

In the detailed description and the claims, a list of items joined by the term "one of" can mean only one of the list items. For example, if items A and B are listed, then the phrase "one of A and B" means A only (excluding B), or B only (excluding A). In another example, if items A, B, and C are listed, then the phrase "one of A, B, and C" means A only; B only; or C only. Item A can include a single element or multiple elements. Item B can include a single element or multiple elements. Item C can include a single element or multiple elements.

In the detailed description and the claims, the terms "first," "second," and "third," etc. are used merely as labels, and are not intended to impose numerical requirements on their objects.

The above description and the drawings illustrate some embodiments of the inventive subject matter to enable those skilled in the art to practice the embodiments of the inventive subject matter. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

What is claimed is:

1. An apparatus comprising:

a bus;

a first memory device coupled to the bus, the first memory device including first circuitry to perform a first error check and scrub (ECS) operation, and a first register circuit to store first information associated with a first time interval to report a result of the first ECS operation to the bus; and a second memory device coupled to the bus, the second memory device including second circuitry to perform a second ECS operation and a second register circuit to store second information associated with a second time interval to report a result of the first ECS operation to the bus.

2. The apparatus of claim 1, wherein the first information and the second information have different values.

3. The apparatus of claim 1, wherein the bus includes a data line and a clock line.

4. The apparatus of claim 1, further comprising an additional bus coupled to the first memory device and the second memory device, and wherein:

the first circuitry is configured to perform the first ECS operation based on a first all-bank refresh (REFab) command on the additional bus; and the second circuitry is configured to perform the second ECS operation based on a second all-bank refresh (REFab) command on the additional bus.

5. The apparatus of claim 1, further comprising an additional bus coupled to the first memory device and the second memory device, and wherein:

the first circuitry is configured to perform the first ECS operation based on an all-bank refresh (REFab) command on the additional bus; and the second circuitry is configured to perform the second ECS operation based on the REFab command on the additional bus.

6. The apparatus of claim 1, wherein:

the first memory device includes a counter to count a number of all-bank refresh operations performed in the first memory device; and the second memory device includes a counter to count a number of all-bank refresh operations performed in the second memory device.

7. The apparatus of claim 1, further comprising a memory controller coupled to the bus.

8. An apparatus comprising:

a first bus to receive all-bank refresh (REFab) commands;

a second bus to receive results of error check and scrub (ECS) operations;

a first memory device coupled to the first bus and the second bus, the first memory device including circuitry to perform a first ECS operation based on one of the REFab commands, and a first register circuit to store first information associated with a first time interval to report a result of the first ECS operation to the second bus; and a second memory device coupled to the first bus and the second bus, the second memory device configured to perform a second ECS operation based on one of the REFab commands, and a second register circuit to store second information associated with a second time interval to report a result of the second ECS operation to the second bus.

9. The apparatus of claim 8, wherein:

the first memory device includes a first additional register to store a number of refresh cycle operation; and the second memory device includes a second additional register to store the number of refresh cycle operations, wherein the number of refresh cycle operations indicates a frequency of ECS operations in the first memory device and the second memory device.

10. The apparatus of claim 8, further comprising:

a third memory device coupled to the first bus and the second bus, the third memory device configured to perform a third ECS operation based on one of the REFab commands, and a third register circuit to store third information associated with a third time interval to report a result of the third ECS operation to the second bus.

11. The apparatus of claim 8, wherein the second bus includes an improved inter-integrated circuit (I3C) bus.

12. The apparatus of claim 8, wherein the apparatus comprises a circuit board, the circuit board including an edge and conductive pins located at the edge, wherein:

the first bus includes conductive paths coupled to a first portion of the conductive pins; and the second bus includes conductive paths coupled to a second portion of the conductive pins.

13. A method comprising:

performing a first error check and scrub (ECS) operation at a first memory device;

performing second ECS operation at a second memory device, the first and second memory devices coupled to a bus;

providing a result of the first ECS operation from the first memory device to the bus during a first time interval; and providing a result of the second ECS operation from the second memory device to the bus during a second time interval.

14. The method of claim 13, wherein:

performing the first ECS operation is based on a first all-bank refresh (REFab) command; and performing the second ECS operation is based on a second all-bank refresh (REFab) command.

15. The method of claim 13, wherein performing the first ECS operation and the second ECS operation are based on a same all-bank refresh (REFab) command.

16. The method of claim 13, wherein the bus includes an improved inter-integrated circuit (I3C) bus.

17. The method of claim 13, further comprising:

receiving, at the first memory device, a first all-bank refresh (REFab) command from an additional bus coupled to the first memory device;

receiving, at the second memory device, a second all-bank refresh (REFab) command from the additional bus coupled to the second memory device; and wherein performing the first ECS operation is based on the first REFab command, and performing the second ECS operation is based on the second REFab command.

18. The method of claim 13, further comprising:

receiving, at the first memory device, a first all-bank refresh (REFab) command from an additional bus coupled to the first memory device, wherein performing the first ECS operation based on the first REFab command;

receiving, at the second memory device, a second all-bank refresh (REFab) command from the additional bus coupled to the second memory device, wherein performing the second ECS operation is based on the second REFab command; and wherein the first time interval is based on timing of a first additional REFab command from the additional bus, and the second time interval is based on timing of a second additional REFab command from the additional bus.

19. The method of claim 13, further comprising:

receiving, at the first memory device, an all-bank refresh (REFab) command from an additional bus coupled to the first memory device;

receiving, at the second memory device, the REFab command from the additional bus coupled to the second memory device; and wherein performing the first ECS operation and performing the second ECS operation are based on the REFab command.

20. The method of claim 13, further comprising:

receiving, at the first memory device, an all-bank refresh (REFab) command from an additional bus coupled to the first memory device, wherein performing the first ECS operation is based on the REFab command;

receiving, at the second memory device, the REFab command from the additional bus coupled to the second memory device, wherein performing the second ECS operation is based on the REFab command; and wherein the first time interval is based on timing of a first additional REFab command from the additional bus, and the second time interval is based on timing of a second additional REFab command from the additional bus.

* * * * *